Patented June 11, 1935

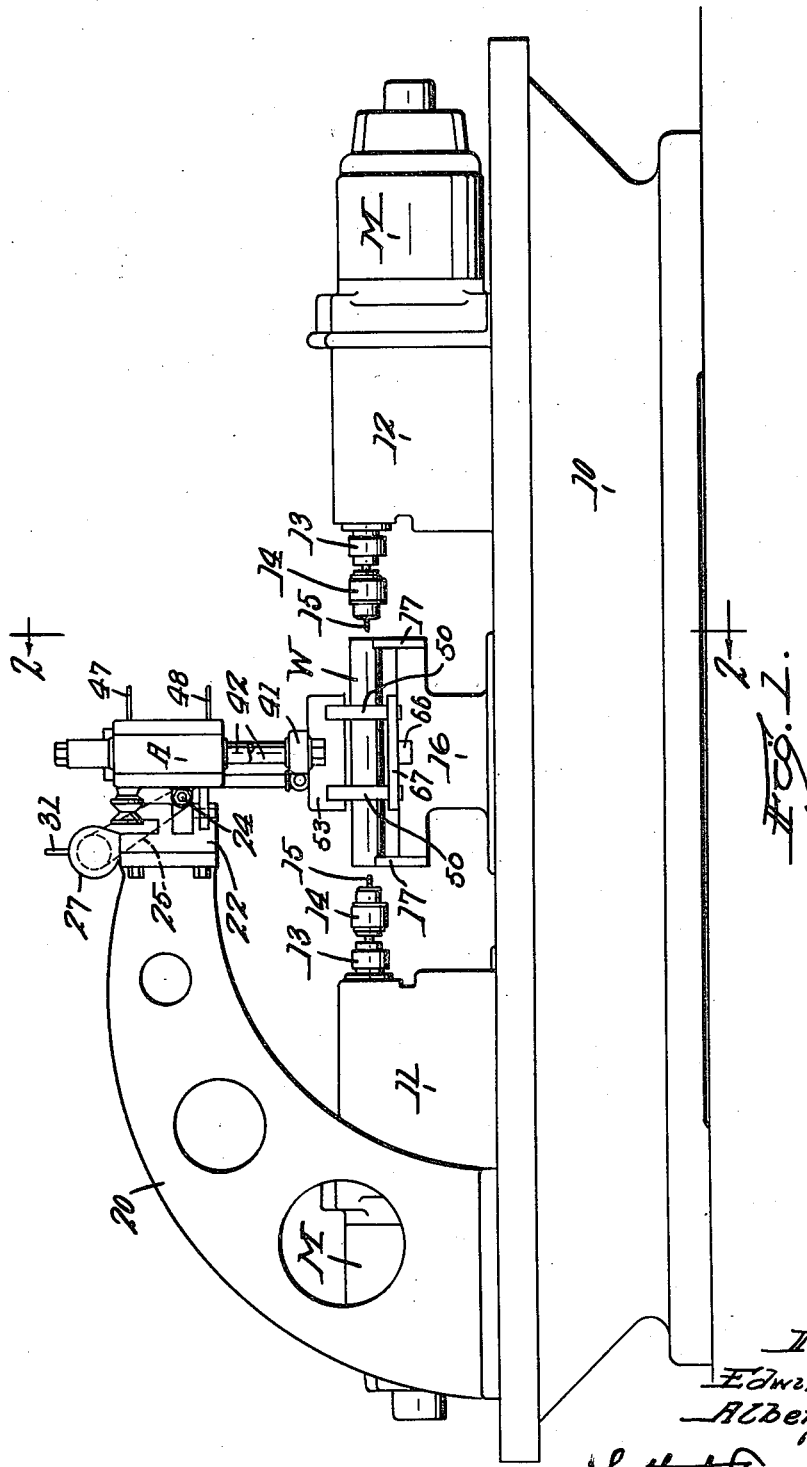

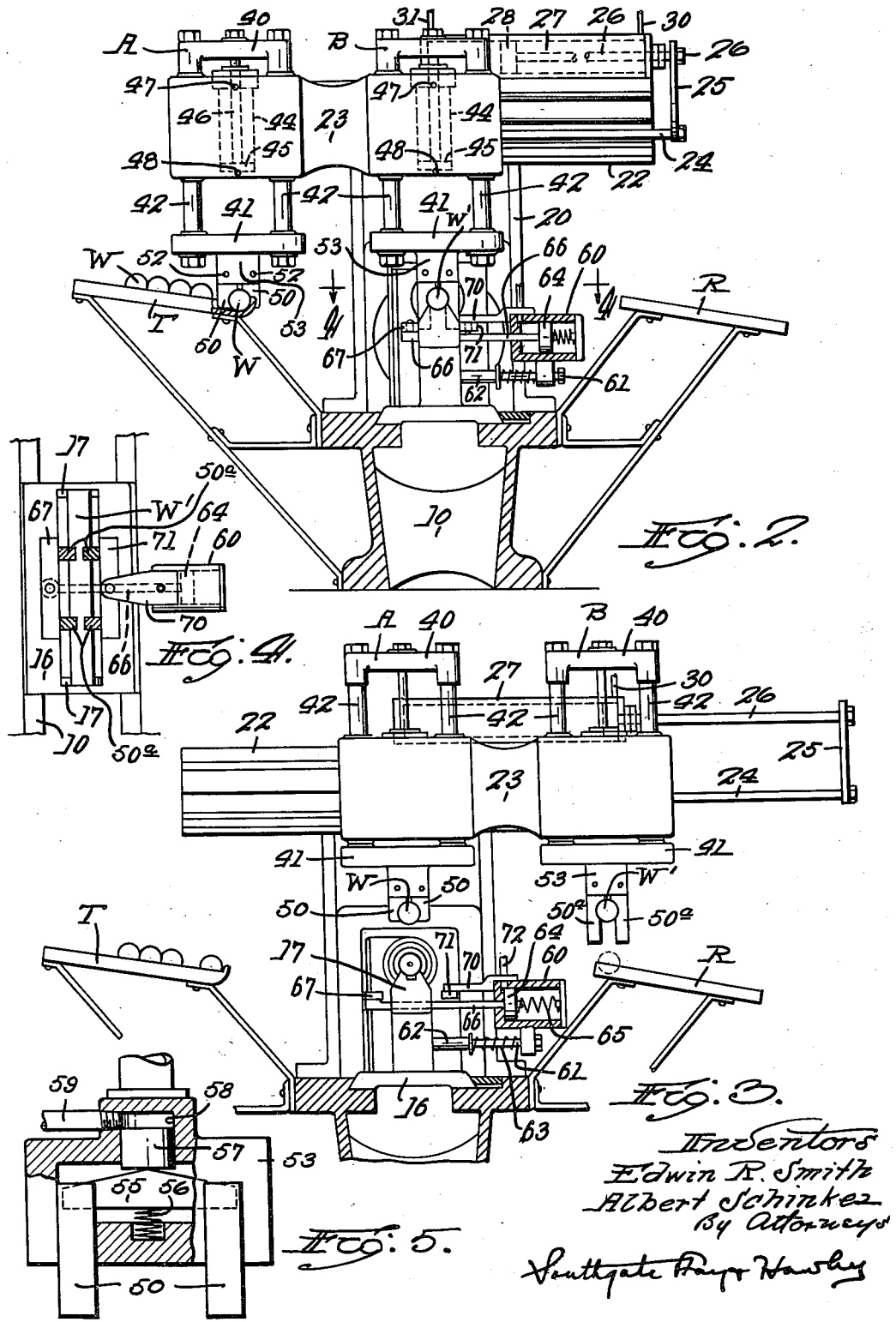

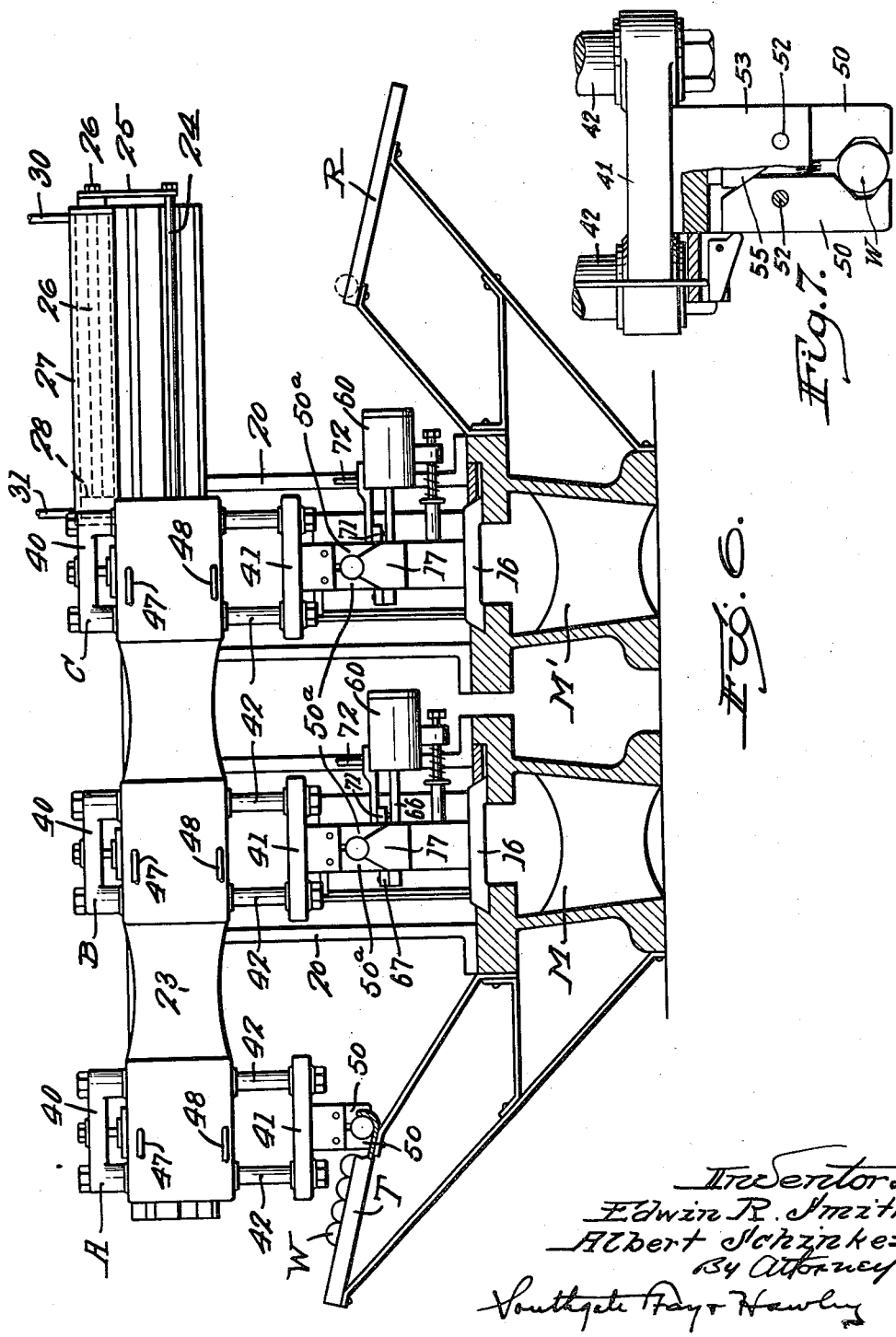

2,004,540

UNITED STATES PATENT OFFICE 2,004,540

WORK-HANDLING MECHANISM FOR CENTERING AND LIKE MACHINES

Edwin R. Smith and Albert Schinkez, Seneca Falls, N. Y., assignors to Seneca Falls Machine Company, Seneca Falls, N. Y., a corporation of Massachusetts Application June 29, 1932, Serial No. 619,948

5 Claims. (Cl. 77—18)

This invention relates to mechanism for feeding unfinished work pieces to a machine tool such as a centering machine and for removing finished pieces of work therefrom.

It is the general object of our invention to provide improved means by which a work piece may be positively advanced to and removed from working position in a machine tool.

A further object is to provide means by which a work piece may be accurately aligned in said machine tool and may be securely held in aligned position during machine operations thereon.

We also provide means for holding a piece of work during a machine operation thereon and for transfer of said work to a succeeding machine without release thereof from the holding means.

Our invention further relates to arrangements and combinations of parts which will be hereinafter described and more particularly pointed out in the appended claims.

A preferred form of the invention is shown in the drawings, in which

Fig. 1 is a side elevation of a centering machine having our improved work-handling mechanism applied thereto;

Fig. 2 is a sectional end elevation, taken substantially along the line 2—2 in Fig. 1;

Fig. 3 is a view similar to Fig. 2 but showing the parts in a different position;

Fig. 4 is a detail sectional plan view, taken along the line 4—4 in Fig. 3;

Fig. 5 is a side elevation, partly in section, of one of the work-gripping devices;

Fig. 6 is an end elevation of an additional adaptation of the invention, and

Fig. 7 is an end elevation of the work-gripping devices shown in Fig. 5.

Referring to the drawings, we have shown our invention as applied to a centering machine having a base 10 supporting heads 11 and 12 in which drill spindles 13 are rotatably mounted. The spindles 13 support chucks 14 and center drills 15 and are separately driven in any suitable manner as by motors M.

The centering machine is also provided with a work support 16 secured to the base 10 between the heads 11 and 12 and having end pieces 17 recessed at their upper ends to receive and support a piece of work W in approximate alignment with the drill spindles 13. The heads 11 and 12 and supports 16 are all longitudinally adjustable on guideways of the base 10.

Our improved work-handling mechanism is assembled on an overhanging bracket 20, also secured to the base 10 and adjustable longitudinally thereon.

Referring particularly to Figs. 2 and 3, the bracket 20 supports a cross stand 22 on which a carriage 23 is slidably mounted. The carriage 23 is connected by a rod 24 and cross arm 25 to a piston rod 26 extending into a cylinder 27 and secured to a piston 28 therein. The cylinder 27 is firmly mounted on the upper rear portion of the cross stand 22 and is connected by pipes 30 and 31 to a suitable supply of fluid under pressure.

As fluid is admitted to one end or the other of the cylinder 27, the carriage 23 is moved from loading to discharge position, or from discharge to loading position, as may be desired.

Work-handling devices A and B are assembled on the carriage 23 and each device comprises a frame having an upper cross bar 40, a lower cross bar 41 and a pair of upright guide-rods 42 slidable in bearings in the carriage 23.

Cylinders 44 are formed in the carriage 23 and each cylinder contains a piston 45 connected by a piston rod 46 to the upper cross bar 40 of one of the work-handling devices A or B. Fluid under pressure may be admitted to either end of the cylinders 44 through pipes 47 and 48, and the work-handling frames are thereby raised or lowered.

Work-gripping devices are mounted on the lower cross bars 41 and preferably comprise gripping arms 50 longitudinally spaced apart and pivoted at 52 in a stand or casing 53 secured to or formed integral with the lower cross bar 41.

The gripper arms 50 of each pair are yieldingly moved apart by springs (not shown) and are provided with inclined faces at their upper inner edges, engaged by a wedge-shaped equalizing bar 55 (Fig. 5). The bar 55 is yieldingly forced upward by a spring 56 and engages the lower end of a piston 57, slidable in the cylinder 58 in the stand or casing 53. When fluid under pressure is admitted through a pipe 59, the equalizer bar 55 is forced downward, forcing the upper ends of the gripper arms 50 apart and causing the lower ends to approach and engage a piece of work W.

For a more complete disclosure of the gripper-operating mechanism, reference is made to our prior Patent No. 1,950,040, issued March 6, 1934.

The work-gripping devices for the work-handling device B are identical with the corresponding parts for the device A, with the exception that the gripper arms 50ᵃ (Fig. 3) are extended downward somewhat lower than the arms 50, for a purpose to be described.

A loading stand or table T is provided at one side of the machine and a delivery stand or runway R is provided at the opposite side of the machine.

Additional work-aligning and securing mechanism is provided on the work support 16, and comprises a cylinder 60 (Fig. 3) mounted on a rod 61 slidable in a bearing 62 in the support 16 and yieldingly pressed outward by a coil spring 63.

A piston rod 66 extends through the inner end of the cylinder 60 and across the work support 16 and is provided with a cross bar 67 pivoted to the outer end of said bar. A bracket 70 is secured to the upper side of the cylinder 60 and is similarly provided with a pivoted cross bar 71. Fluid under pressure may be admitted through a pipe 72 to the inner end of the cylinder 60.

Having thus described the details of construction of our improved work-handling mechanism, the method of operation thereof is as follows:—

The parts are shown in Fig. 2 with the gripper arms 50 of the lowered device A engaging a new work piece W on the loading table T and with the gripper arms 50ᵃ of the lowered device B engaging a work piece W' in working position. Furthermore, fluid under pressure has been admitted to the cylinder 60, causing the cylinder to move bodily to the left, as viewed in Fig. 2, and causing the piston 64 to move simultaneously to the right.

These simultaneous but opposite movements cause the cross bars 67 and 71 to engage the depending lower ends of the gripper arms 50ᵃ and thus force the grippers firmly against the work so as to align the work and to hold the work definitely in operative position during the drilling of the center holes or other machine operations thereon.

When the work is completed, fluid pressure in the pipe 72 and cylinder 60 is relieved, and the springs 63 and 65 move the gripping devices 67 and 71 from the position shown in Fig. 2 to that shown in Fig. 3, thus releasing the work piece W'.

Pressure is then applied through the lower pipes 48 to the cylinders 44, causing the grippers to be moved upward, and pressure is then applied through the pipe 31 to the left-hand end of the cylinder 27, causing the carriage 23 to be shifted to the discharge position indicated in Fig. 3.

Pressure is then applied through the upper pipes 47 to the cylinders 44, lowering the new work piece W to working position and the finished work piece W' to the discharge position indicated at the extreme right in Fig. 3.

Pressure is then relieved in the gripper cylinders 58, releasing both the new and the finished work pieces.

The grippers are then raised, the carriage 23 is shifted to the left, the grippers are then moved downward and pressure is again applied to the gripper cylinders 58, closing the grippers 50 on a new piece of work W on the loading table and closing the gripper arms 50ᵃ on the piece of work just deposited on the upwardly extending arms of the work support 16.

Pressure is then applied to the cylinder 60 through the pipe 72, advancing the cross bars 67 and 71 to engage the lower ends of the gripper arms 50ᵃ and force these arms strongly against the work W.

The various movements of the different parts of our work-handling mechanism may be manually controlled, or automatic devices may be provided for effecting these movements in predetermined order. Cam mechanism suitable for such automatic control is disclosed in our prior Patent No. 1,841,988, issued January 19, 1932.

In Fig. 6 we have shown an application of our invention to a plurality of machine tools. In this case machine tools M and M' are shown, together with three work-handling heads A, B and C. The head A operates as previously described to transfer a new piece of work W from the loading table T to the first machine M. The head B holds the work in predetermined position in the machine M during machine operations thereon and also transfers the work to the second machine M'. The work-handling head C holds the work in position in the machine M' during further machine operations thereon and thereafter transfers the work to the discharge runway R.

Clamping mechanism such as has been previously described is provided in both machines M and M' for applying additional pressure to the work-engaging devices or grippers during machine operations.

In such a combination of machines as is indicated in Fig. 6, an additional advantage of our invention becomes clearly apparent,—namely, the fact that the piece of work W is retained by the work-engaging members of the head B and without relative movement in said members until it is positioned in the second machine M', where it is thereafter gripped and held by the work-engaging members of the head C.

As the work is presented in the second machine by the same gripping mechanism which held the work in the first machine, any rolling or angular shifting of a non-circular or curved piece of work is avoided and the work is centered in the same angular position in each of two or more succeeding machines. For irregular work, this is a very important advantage.

Having thus described our invention, it will be seen that we have provided work-handling mechanism by which a piece of new work may be positively advanced to working position and a piece of finished work may be positively removed therefrom and that we have also provided means by which the new work piece is firmly gripped and held in aligned position during center boring or other machine operations thereon.

Having thus described our invention and the advantages thereof, we do not wish to be limited to the details herein disclosed, otherwise than as set forth in the claims, but what we claim is:—

1. A work-handling mechanism for a machine tool comprising a pair of grippers effective to grasp and advance a piece of work to working position, an additional pair of grippers effective to grasp and hold said piece of work during a machine operation thereon and to thereafter remove said piece of work from working position, pressure-applying means for said additional pair of grippers, and power operated means forming a constituent part of said machine and operable to apply supplementary clamping pressure to said additional pair of grippers during said machine operation on said work piece and while said work piece is held by said additional pair of grippers and also operable to thereafter release said additional grippers.

2. In a machine tool, a work support, work-engaging and transporting means effective to present pieces of work successively on said support, and power operated means forming a constituent part of said machine and movably mounted on said support, said latter means being effective to increase the pressure of said work-engaging means on each piece of work while the work is positioned thereby relative to said support and during a machine operation thereon, said latter means comprising a floating cylinder mounted on said work support for movement relative thereto, a piston movable in said cylinder, said cylinder and piston moving in opposite directions relative to said work support and transversely of said machine upon the application of fluid pressure in said cylinder, and means connected with said cylinder and piston respectively and directly contacting said work-engaging means on opposite sides thereof.

3. A work-handling mechanism for a machine tool having a storage for new work pieces, comprising two sets of successively operating work-engaging and transporting devices, each set having gripper arms, the arms of the second set being downwardly extended beyond the arms of the first set, whereby said extended arms will engage a work piece in operative position in said machine tool when the arms of said first set engage a work piece in storage, means to cause said gripper arms to yieldingly engage the work during transportation thereof, and additional power operated means forming a constituent part of said machine and operable to apply pressure against the said downwardly extending arms to increase the pressure of said arms on the work during a machine operation thereon and also operable to thereafter release said gripper arms.

4. In a machine tool, a longitudinally extended bed, an overhanging bracket mounted thereon, a cross stand on said bracket having guideways thereon, a carriage slidable on said guideways transversely of said bed, two sets of spaced work-holding and transporting devices on said carriage, each set comprising work-engaging elements, means to raise and lower said elements, and means to open and close said elements to cause said elements to yieldingly engage the work, and additional power operated means forming a constituent part of said machine and operable to directly engage and apply increased closing pressure to the work engaging elements of one set during a machine operation on a piece of work supported in operative position thereby and also operable to thereafter release said work engaging elements.

5. In a machine tool, a longitudinally extended bed, an overhanging bracket mounted thereon, a cross stand on said bracket having guideways thereon, a carriage slidable in said guideways transversely of said bed, two sets of spaced work-holding and work-transporting devices on said carriage, each set comprising two pairs of gripper arms spaced apart axially of the work, means to raise and lower said elements and to open and close said elements and to cause said elements to yieldingly engage the work, the first set delivering the work to the second set before a machine operation thereon, and additional power operated means forming a constituent part of said machine and operable to simultaneously engage and directly apply increased closing pressure to both arms of both pairs of grippers of the second set during a machine operation on a piece of work supported in operative position thereby.

EDWIN R. SMITH.
ALBERT SCHINKEZ.